No. 775,540. PATENTED NOV. 22, 1904.
J. A. McCONNELL.
APPARATUS FOR MOLDING PIPE COVERINGS.
APPLICATION FILED MAY 7, 1902.
NO MODEL. 6 SHEETS—SHEET 1.
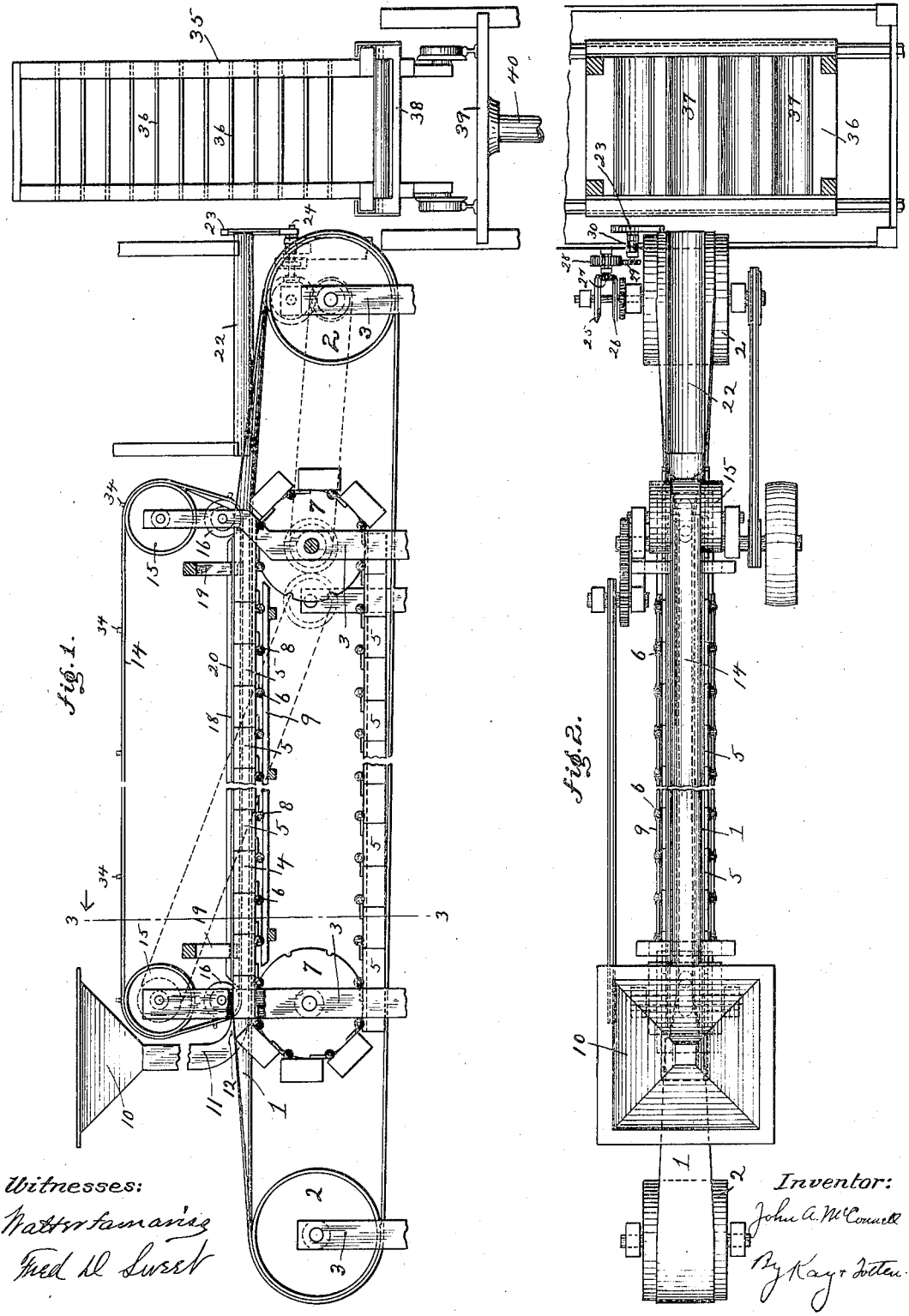
Witnesses:
Inventor:
John A. McConnell
By Kay & Totten
Attorneys.

No. 775,540. PATENTED NOV. 22, 1904.
J. A. McCONNELL.
APPARATUS FOR MOLDING PIPE COVERINGS.
APPLICATION FILED MAY 7, 1902.
NO MODEL. 6 SHEETS—SHEET 2.
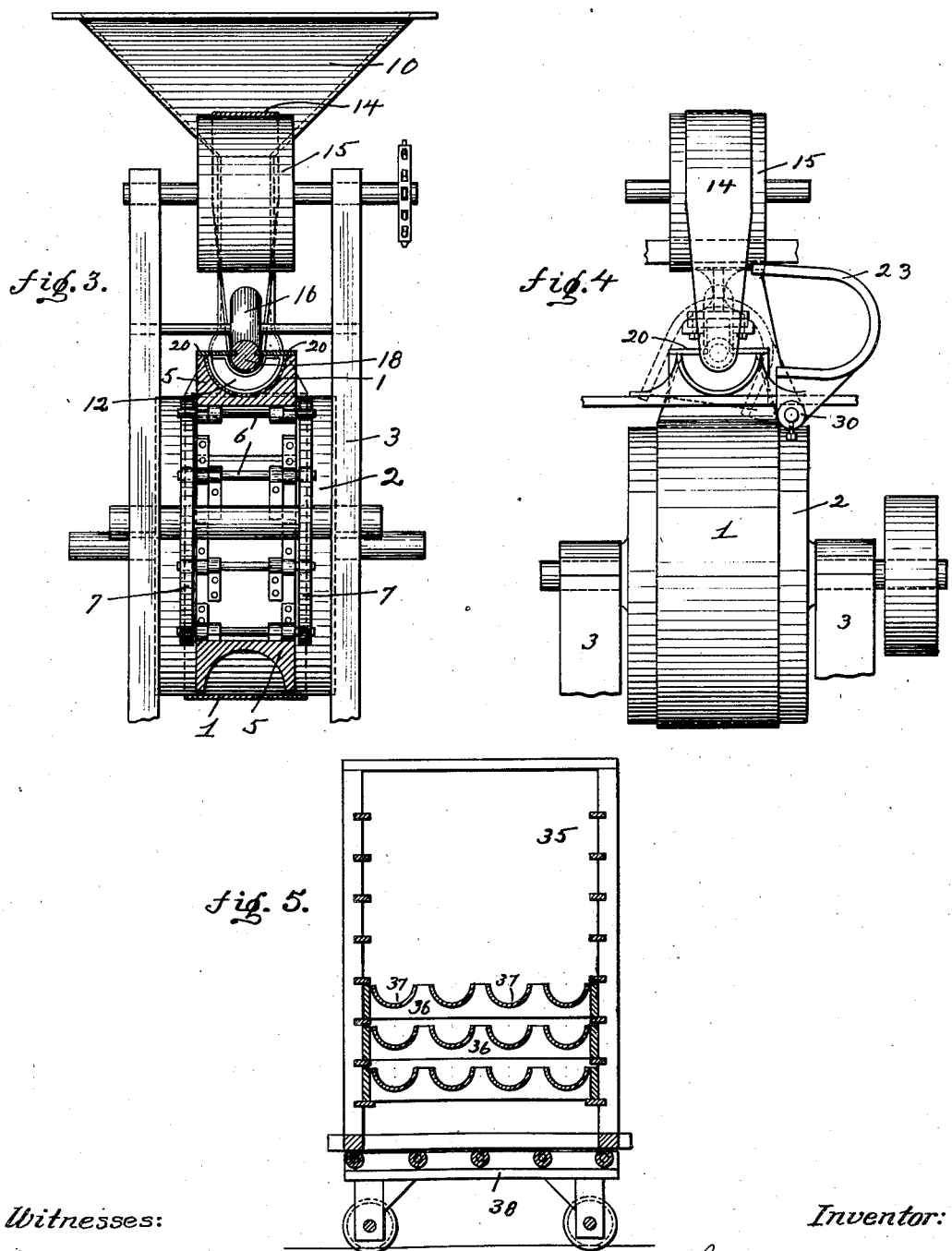

No. 775,540. PATENTED NOV. 22, 1904.
J. A. McCONNELL.
APPARATUS FOR MOLDING PIPE COVERINGS.
APPLICATION FILED MAY 7, 1902.
NO MODEL. 6 SHEETS—SHEET 3.
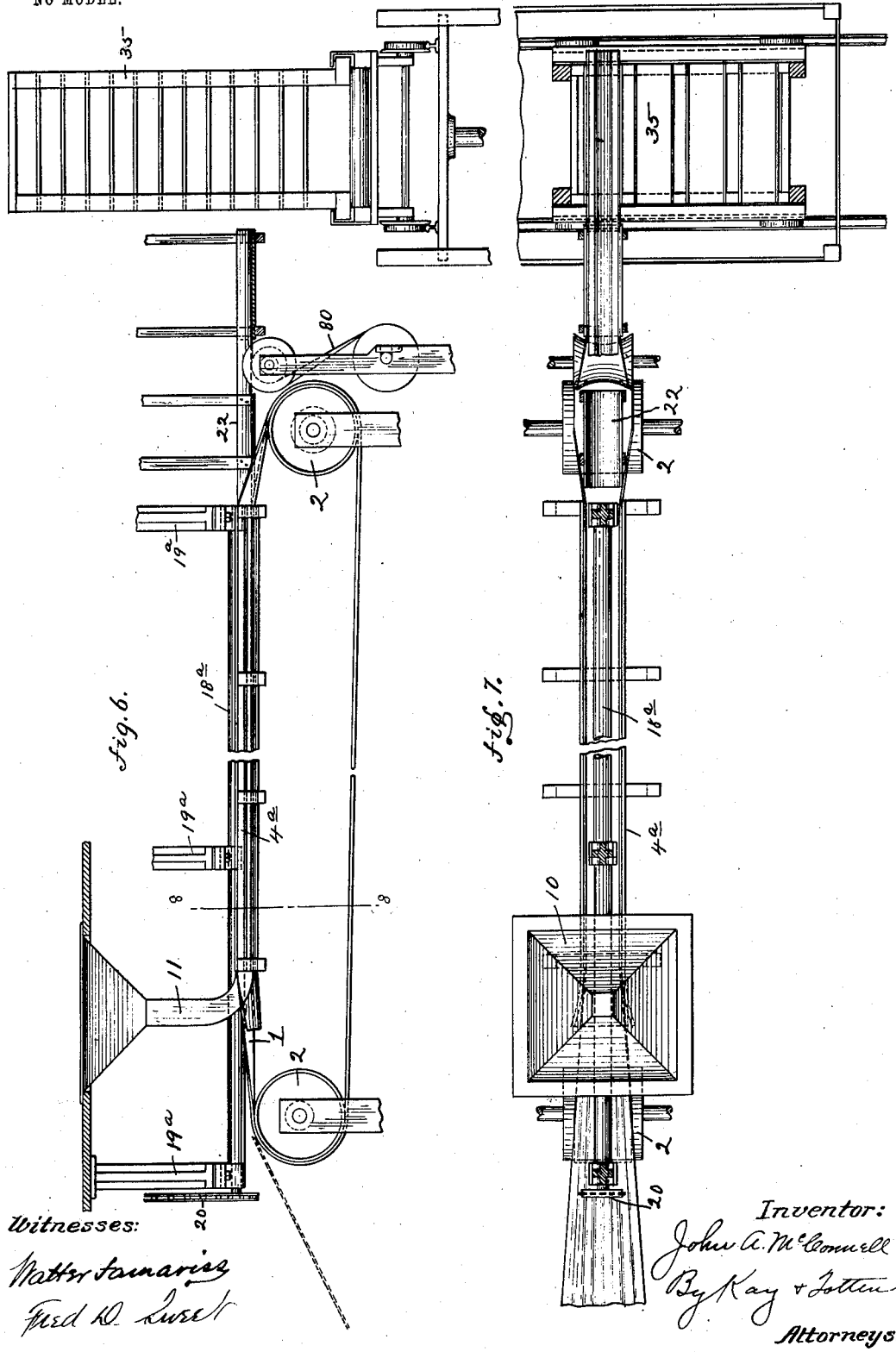

No. 775,540. PATENTED NOV. 22, 1904.
J. A. McCONNELL.
APPARATUS FOR MOLDING PIPE COVERINGS.
APPLICATION FILED MAY 7, 1902.
NO MODEL. 6 SHEETS—SHEET 4.
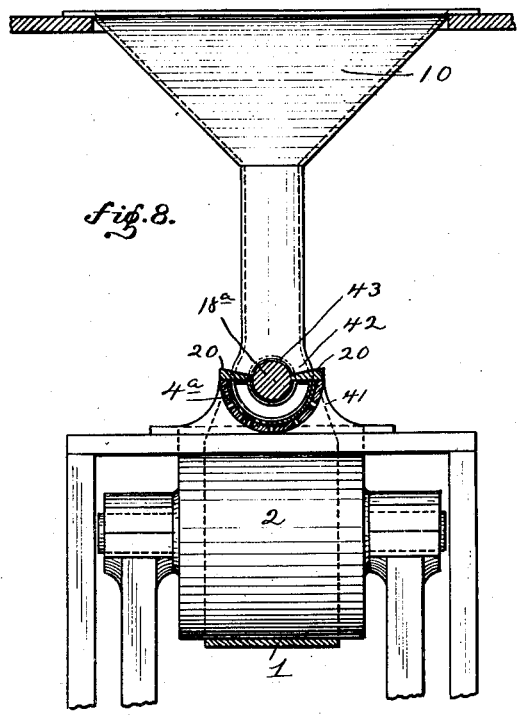
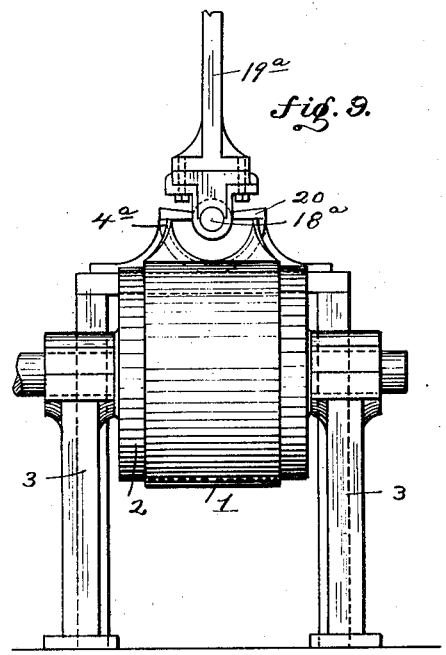
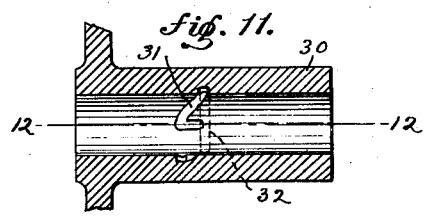
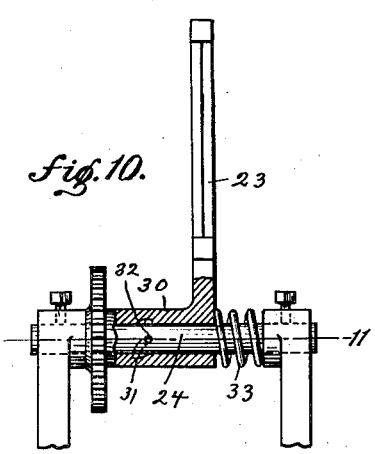
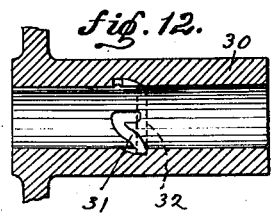
Witnesses:
Inventor:
John A. McConnell
By Kay & Totten
Attorneys.

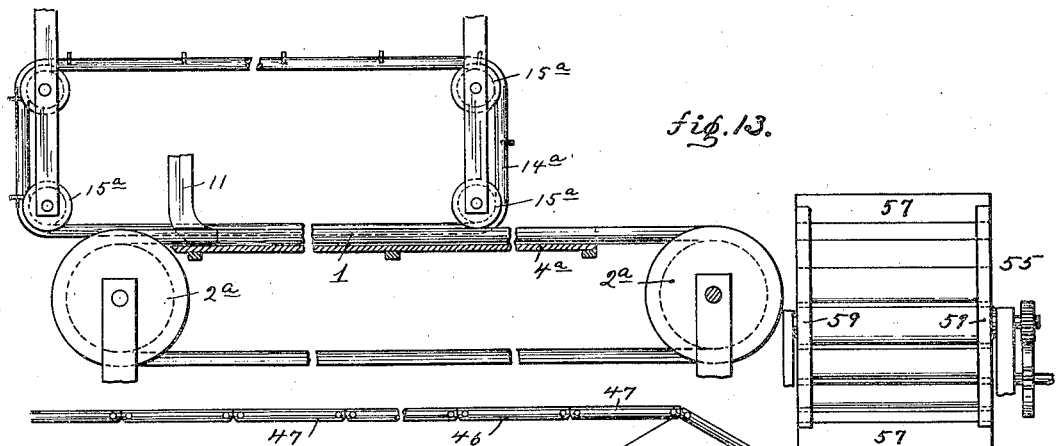
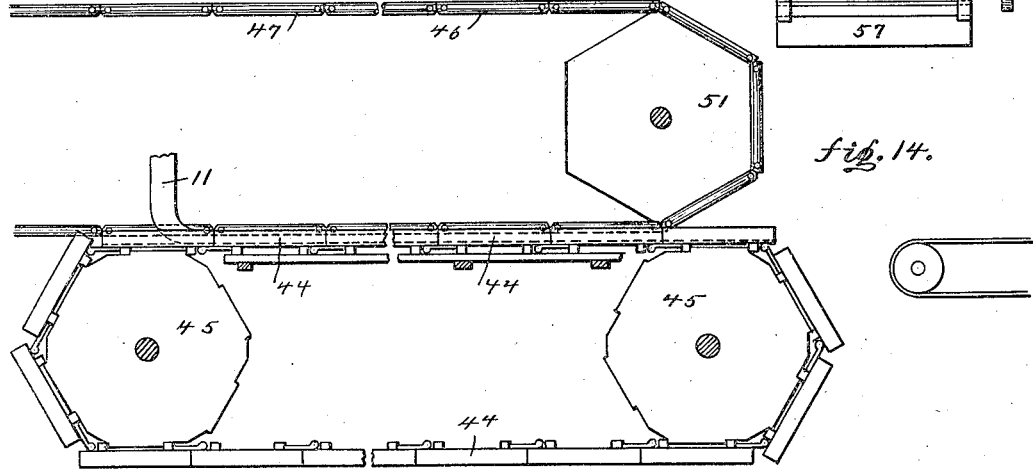
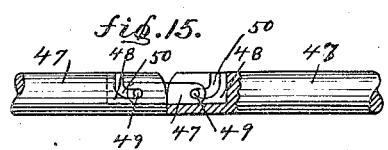
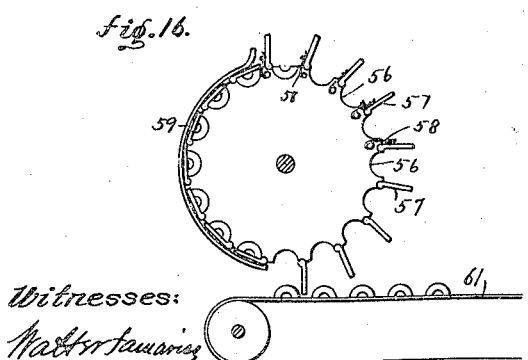
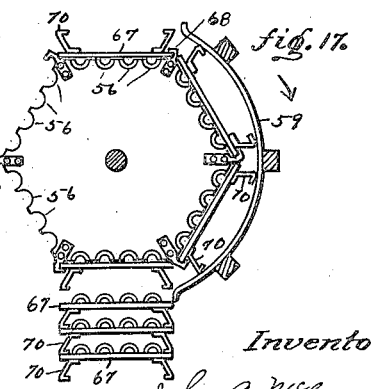

No. 775,540. PATENTED NOV. 22, 1904.
J. A. McCONNELL.
APPARATUS FOR MOLDING PIPE COVERINGS.
APPLICATION FILED MAY 7, 1902.
NO MODEL. 6 SHEETS—SHEET 6.
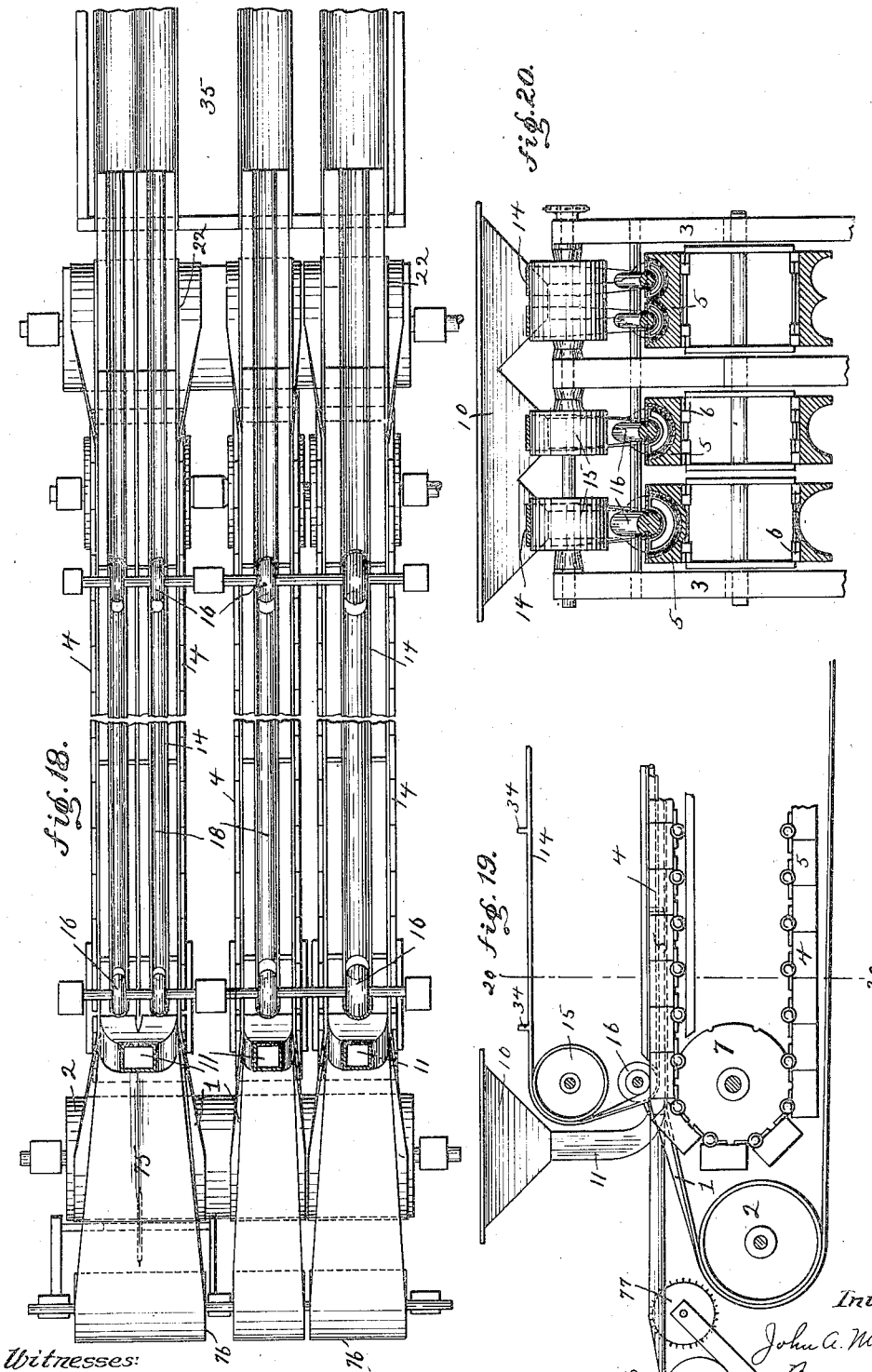
Witnesses:
Inventor:
John A. McConnell
By Kay & Totten
Attorneys.

No. 775,540. Patented November 22, 1904.

UNITED STATES PATENT OFFICE.

JOHN A. McCONNELL, OF ALLEGHENY, PENNSYLVANIA, ASSIGNOR TO McCONNELL ASBESTOS & COVERING CO., OF PITTSBURG, PENNSYLVANIA, A CORPORATION OF PENNSYLVANIA.

APPARATUS FOR MOLDING PIPE-COVERINGS.

SPECIFICATION forming part of Letters Patent No. 775,540, dated November 22, 1904.

Application filed May 7, 1902. Serial No. 106,279. (No model.)

*To all whom it may concern:*

Be it known that I, JOHN A. McCONNELL, a resident of Allegheny, in the county of Allegheny and State of Pennsylvania, have invented a new and useful Improvement in Apparatus for Molding Pipe-Coverings; and I do hereby declare the following to be a full, clear, and exact description thereof.

My invention relates to apparatus for molding semitubular non-conducting coverings from materials which set by adding water to them, such as plaster-of-paris, calcined magnesia, or hydraulic cement or mixtures of such materials with other suitable materials and preferably having asbestos, hair, or other suitable fiber mixed therewith.

The object of my invention is to provide apparatus for this purpose which is adapted to mold such materials in a substantially continuous manner.

In molding tubular or semitubular non-conducting coverings the practice heretofore has been to add enough water to the materials and agitate the same until a semiliquid mass was formed, which was then poured into tubular or semitubular molds with a core in the center and there allowed to set, after which the molded tube or half-tube and core were removed from the mold. Two forms of molds have been generally used, one being semitubular or trough-shaped and used in a horizontal position and the other being tubular and used in an upright position, the former molded a half-tubular section and the latter a tubular section. The tubular section was afterward cut longitudinally into half-tubes, so that it could be readily placed around a pipe or other cylindrical body. The customary length of these molds is three feet. Hence each semitubular mold would make the equivalent of eighteen inches of tubular covering at each filling and the tubular upright molds would make three feet. The practice has been to pour the semiliquid mass into the molds by hand from buckets, or at best to spill the same into the molds by means of a hose held in the hand of the operator. In all cases, however, it is a slow hand process, and the subsequent opening of the molds and removing the cores and molded sections therefrom by hand, cutting open longitudinally and then squaring the ends of the tubular sections, or matching the edges and ends of the semitubular sections makes either of the customary operations slow and tedious. Furthermore, the sections being only three feet long necessitates frequent joints, at which heat can escape and cold enter, besides marring the appearance of the covering when in place.

The object of my present invention is to provide apparatus which will make these tubular or semitubular coverings in continuous molds, which move either uninterruptedly or at quick intervals, thus making the articles very rapidly and perfectly and of any desired length.

In the accompanying drawings, Figure 1 is a side view of one form of my apparatus. Fig. 2 is a plan view of the same. Fig. 3 is a cross-section on the line 3 3, Fig. 1. Fig. 4 is a view of the delivery end of said apparatus. Fig. 5 is a vertical section of the rack for receiving the molded articles. Fig. 6 is a side view of a modified form of apparatus. Fig. 7 is a plan view of the same. Fig. 8 is a cross-section on the line 8 8, Fig. 6. Fig. 9 is a rear end view of this apparatus. Figs. 10, 11, and 12 are detail views showing the cutting means. Fig. 13 is a side view of another modification. Fig. 14 is a similar view of still another modification. Fig. 15 shows details of the core of the last modification. Fig. 16 is an end view of the delivery apparatus shown in Fig. 13. Fig. 17 is a similar view of a modification. Fig. 18 is a plan view showing a double apparatus. Fig. 19 is a side view of a portion thereof; and Fig. 20 is a cross-section on the line 20 20, Fig. 19.

The essential feature of my invention is an endless traveling mold of semitubular form, together with a core therefor. These parts may take various forms without departing from the spirit of my invention; but preferably the mold will be an endless belt 1 traveling over power-driven drums or pulleys 2, mounted in suitable frames 3. This belt will preferably be made of rubber or other material which is not readily affected by moisture, and means will be provided for holding the upper reach thereof in trough or semitubular shape. Preferably there will be placed beneath the upper reach of the belt a semitubular trough 4, and this trough preferably will be made movable with the belt. As shown in Fig. 1, the trough 4 is composed of a series of sections 5, each of which has one face formed semitubular, as shown in Fig. 3. These sections are preferably hinged together, as shown at 6, so as to form, in effect, an endless sectional trough which passes over suitable power-driven wheels 7, mounted in the frame 3. This trough is so positioned with reference to the upper reach of the belt 1 that it will hold the same into trough shape, as shown in Fig. 3, and preferably it will be driven at the same rate of speed as the belt 1, so that the latter is relieved of all friction or drag, and a substantially continuous or endless semitubular mold is formed thereby. Instead of the hinged sections shown the trough may be formed by a concave chain belt or other suitable jointed sections. The trough-sections 5 are provided with lugs 8, which slide on stationary bars 9 or have wheels thereon which roll on said bars to keep the trough from sagging at the center. The semiliquid mass of material may be fed to the belt in any suitable way, either being poured by hand thereon, but preferably being delivered to a hopper 10, from which a spout 11 leads downwardly to the belt 1 and having a curved end 12, so as to deliver the semiliquid material onto the belt after the same has been formed into trough shape.

, A suitable mandrel or core must be used in connection with the mold, and this likewise may be of various forms, either stationary, rotary, or traveling. In Fig. 1 this core is formed by an endless traveling belt 14, which passes over power-driven drums or pulleys 15 and over the guide-pulleys 16, mounted in proximity to the belt 1 and having their faces convex, as shown, so as to cause the belt to take a semicylindrical shape on its lower face. The lower reach of the belt therefore forms the core and coöperates with the belt 1 to mold the semitubular article between the same. Preferably some means for supporting or holding this belt firmly in place will be employed, and in Fig. 1 I have shown a bar 18 suspended from the hangers 19 and preferably of semicircular form, as shown in Fig. 3, this bar serving as a backing for the lower reach of the belt.

It is desirable to close the upper side of the mold, so as to prevent the material spilling out. I have provided for this purpose covers 20, which may be supported in any suitable way, but which conveniently can be secured to the core-bar 18, as shown in Fig. 3, and which rest upon the upper edges of the trough-sections 5. These covers 20 are stationary.

The guide-pulleys 16, over which the core-belt 14 passes, are located beyond the ends of the core-bar 18 and cover-plates 20, so that the core-belt will pass underneath the core-bar and cover-plates.

At the delivery end of the machine I provide a suitable trough 22, lying above the belt 1 and supported from the frame, upon which trough the semitubular mold-section will be forced by the forward travel of the endless mold. The article comes from the mold continuously as long as material is supplied to the mold. When a traveling core, such as shown in Figs. 1, 3, 14, and 19, is used, the article can conveniently be divided into sections by securing to said traveling core separating-plates 34, which will divide the semiliquid material in the mold and form the articles in sections. When, however, a non-traveling core, such as shown in Figs. 6 and 7, is employed, it will be necessary to divide the continuous article into sections, and this can conveniently be done at the end of the trough 22 either by means of a hand-saw or knife, but preferably by means of power-actuated cutting mechanism, which is caused to traverse the path of movement of the article and sever the same. If the mold is traveling continuously, the cutting device is made to travel forward at the same rate as the mold while traversing the path of the molded article. The cutting mechanism may comprise either a saw mounted in a swinging or moving frame or a knife or wire. I have shown the latter as a convenient means for accomplishing this purpose. The mold of course will be of such length, relatively very much longer than shown in the drawings, to enable the semiliquid mass to set by the time it leaves the mold; but the article will still be sufficiently soft so that a cutting-wire will sever the same. This cutting-wire is shown attached to a U-shaped frame 23, which is mounted on a shaft 24, so that it can be rocked to carry the cutter across the path of the article and move along with the same. Any suitable mechanism for this purpose may be employed. I have shown a pair of beveled gears 25 and 26 on the drum-shaft 2, which gears are mutilated and oppositely arranged and mesh with a beveled pinion 27, to which is connected a long gear 28, which in turn meshes with a gear 29, secured to the sleeve 30, to which the cutter-frame 23 is attached. The oppositely-arranged mutilated gears are driven at such a rate that they will rock the frame 23 at predetermined lengths of article— say at every six feet of the travel of the continuous mold—and as they are oppositely arranged the cutter will be caused to sever the article in both directions of its movement, so as to cut off sections, say, three feet long. The sleeve 30 is slidably mounted on the shaft 24 and is provided with a cam-groove 31, which is engaged by a pin 32 in an opening in the shaft, which will move the sleeve longitudinally, so that the cutter will travel with the article when severing it, so as to cut the same at right angles. A spring 33 returns the sleeve and cutter to its original position after each severing of the article.

Adjacent to the delivery end of the trough 22 I provide suitable mechanism for receiving the cut-off sections and conveying them away. This mechanism may also be of various forms. For instance, in Figs. 1 and 2 I have shown a rack 35 provided with a series of shelves 36, each of which is provided with a series of semicylindrical concave depressions 37. This rack is preferably placed upon a truck 38, which in turn runs on suitable tracks on the elevator 39, the latter being adapted to be raised and lowered by any convenient mechanism—such, for instance, as the piston-rod 40 of a suitable power-cylinder. In the operation of the machine the lowermost shelf is brought into line with the delivery-trough 22, and as soon as one of the concave depressions in this shelf has received a section the truck is moved slightly to one side to bring another depression in line with the trough 22, and so on until that shelf is entirely filled, or if several molds are being operated parallel with each other the concave depressions on each shelf will all be filled at once. The rack is then lowered or raised, as the case may be, by means of the elevator to bring the next shelf opposite the trough, which in turn is filled in the manner specified. After the entire rack has been filled the truck with the same is rolled off the elevator to the drying-room, where the filled rack, preferably having rollers or casters for feet, is removed therefrom and an empty rack placed thereon and then returned to the machine to receive its load of semitubular sections. This provides a convenient means for conveying and drying the molded sections without necessitating any handling thereof.

The modification shown in Figs. 6 to 9 differs from that shown in Fig. 1 in that the trough 4ª instead of being movable, as in Fig. 1, is made stationary; but it serves the same function as the sectional trough in forming and holding the belt 1 in trough form. This form of trough is preferably formed of separated longitudinal slats or of perforated metal to admit air and overcome the suction and friction of the rubber mold upon the trough. In this modification also the mandrel comprises a cylindrical bar 18ª, which is rotatably mounted in the lower ends of the hangers 19ª and which is rotated by any suitable mechanism—such, for instance, as the sprocket-wheel and chain 20 shown. This mandrel, it will be observed, does not travel with the molded article; but since it is rotated the material will not stick thereto. The cover-plates 20 in this case cannot be supported from the mandrel-bar, but are supported on brackets 41 projecting from the frame of the machine. These cover-plates are preferably thicker at their outer edges or have their outer edges turned up, so that any of the semifluid material which may leak out around the core will drain back into the mold. Inasmuch as this mandrel-bar projects beyond the spout 11 for delivering the semiliquid material to the mold, the spout must be shaped so as to permit the passage of the mandrel-bar. This is shown in Fig. 8, wherein the lower end of the spout 11 is widened out at 42 and provided with an opening 43 therethrough, which is surrounded by a suitable bushing through which the mandrel-bar 18ª passes.

In the modification shown in Fig. 13 the belt 1 is shown as passing around pulleys or drums 2ª having concave faces, so that the belt is always held in trough shape. This figure also shows the stationary trough 4ª. The mandrel is composed of a tubular belt 14ª, passing over driving and guide pulleys 15ª, which are provided with concave faces to receive the tubular belt. The delivery-spout 11 in this case is formed the same as shown in Fig. 8, so as to permit the core 14ª to pass therethrough. This, however, is not necessary, as the material at that end of the apparatus is liquid and the core can pass through it at an angle.

In the modification shown in Fig. 14 the endless mold is formed as a series of sections 44 hinged to each other, as shown, and passing over suitably-shaped wheels or drums 45. In this case the belt 1 is omitted, and the sections 44 are made to fit closely and to receive the plastic material directly. These sections of course are formed with semicylindrical concave faces, so as to form the semitubular article. The core-bar in this case is composed of an endless sectional bar 46, the sections being cylindrical in shape, as shown in Fig. 15, and being connected to each other by means of links 47, seated in slots 48 in the ends of the sections and provided with studs 49, which are seated in the curved recesses 50, so that the sections can be readily separated. This sectional core-bar passes over suitably-shaped power-driven wheels 51 and travels with the endless mold and preferably at the same speed. The delivery-spout 11 in this case also is so shaped as to permit the core-bar to pass therethrough.

For molding magnesia, which sets very slowly, the sections 44 may be formed as molds separate from their carrying means. These molds after receiving the material would be delivered at the rear end of the carrier and conveyed away to give the magnesia time to set.

Instead of using the racks 30 (shown in Figs. 1, 2, 5, 6, and 7) I may employ other delivery mechanism. For instance, in Figs. 13 and 16 I have shown a rotating drum or the like 55 provided with concave depressions 56 on its periphery for receiving the semitubular sections as they are delivered from the molds. Adjacent to each of the depressions 56 is hinged a cover 57, which has connected thereto a spring 58 for holding the same normally extended. One side of this drum is inclosed by the guide or shield 59, which will cause the covers 57 to close over the sections held in the depressions 56, as shown in Fig. 16, in which position the parts are held until the end of said guide is cleared, when the covers 57 will swing outward by gravity or by the force of the springs 58, thus permitting the molded section to drop down upon a suitable table or belt 61, by which it is conveyed away.

If desired, a series of molds and cores, such as shown in each of the figures, may be placed side by side and operated in unison—say four such molds, as shown in Figs. 18 to 20—in which event each of the shelves of the racks shown in Fig. 5 would be filled simultaneously, so that no lateral movement of the truck on the elevator would be necessary; but as soon as one shelf is filled the rack may be lowered or raised, as the case may be, to bring the next shelf into line with the molds. In such case the rotary delivering mechanism shown in Fig. 16 would be modified substantially as shown in Fig. 17—that is, instead of being circular it will be polygonal in outline, and each face thereof will be provided with a series of depressions 56, corresponding in number to the number of molding apparatus employed, four being shown in Fig. 17. In that case as soon as one of the faces of said drum is filled with molded sections I place over the same a shelf 67, which will have one edge held under the clip 68, secured to the drum, while the opposite edge of the shelf will be free. The drum will rotate in the direction shown by the arrow, and the guide 59 will hold the shelves and sections in place. The forward end of the shelf is the one that is held by the clip 68, so that when said forward end passes the end of the guide 59 it cannot immediately drop; but the rear end of the shelf is not held by any clip, and as soon as it passes the end of the guide 59 it will drop, thus permitting the other end to fall out of the clip 68. The shelves will be deposited upon a suitable truck or other means, and, preferably, I provide each of the shelves with legs 70, so that one shelf will drop upon the preceding one. These shelves or the truck bearing them will preferably be on a platform or elevator, which will gradually be lowered as the shelves thereon accumulate, and a series of shelves may be removed on a truck, as described in the preferred modification. By the delivery apparatus shown in Figs. 16 and 17 the molded sections are inverted, whereas with the rack shown in the preferred modification they are delivered with their concave faces up.

When it is desired to sheath the sections with cloth or paper, a strip of the sheathing material 75 of the proper width will be introduced into the molds. Preferably two molds of the same size will be placed in close parallel proximity, as shown in Figs. 18 and 20, and the strip of material will be of sufficient width to line the interior of both molds. The strips 75 are supported on rolls or spools 76 and travel along with the molds. They thus become attached to outer surfaces of the two half-sections, form a sheathing therefor, and also forming a hinge which allows the two halves to form a tube. A wheel 77, having teeth or needles on its periphery, engages the strip and keeps it from shifting sidewise. I may place in each mold a separate strip of paper or cloth wide enough to overlap each other and preferably coated on their inner surfaces with adhesive material. This will cause the two strips to adhere and form the hinge. With a single mold a single strip will be used, as shown at 75 in Figs. 6 and 7, and this strip may be fluted longitudinally, as shown in Fig. 7. The strips preferably are introduced at the front end of the apparatus and travel with the molds; but they may be introduced at the rear end, as at 80, Fig. 6, in which case an adhesive material is applied to the inner face of the strip to cause it to adhere to the article. In some cases the lining-strip may take the place of the belt mold and permit the latter to be dispensed with.

The operation of the apparatus will be readily gathered from the foregoing description. Suffice it to say that the endless continuous molds, whether in the form of trough-sections shown in Fig. 14 or in the form of an endless belt, as shown in the remaining figures, which endless belt may be supported either by a stationary trough, as in Figs. 6 and 13, or by a traveling sectional trough, as in Fig. 1, receives the semiliquid mass from the hopper 10, and the mass is shaped in said traveling mold by the core-bar, which may be either rotary, as shown in Fig. 6, or of the various forms of traveling cores shown in the remaining figures. During the traveling of the molds the semiliquid mass is held in shape and gradually sets, and by the time it reaches the end of the machine it has set sufficiently to maintain its shape. Here, unless molded in sections, it is cut into sections by the mechanism described or any other suitable mechanism and then delivered from the machine either into the racks 30 or onto the rotary delivery devices shown in Figs. 16 and 17. It will be apparent that working two of these molds together facing each other that tubular sections may be molded, and means provided to withdraw the core.

The specific form of molding apparatus shown in Figs. 6 to 9 and the cutting-off mechanism shown in Figs. 10 to 12 and the specific delivery apparatus shown in Figs. 13, 16, and 17 are not claimed in this application, but are claimed in an application which is a division of this application and filed February 23, 1904, Serial No. 194,810.

By means of this apparatus the tubular covering will be formed in a practically continuous manner, as the molds can be either driven continuously or in a rapidly-intermittent manner. In either event, however, almost an unlimited quantity of semitubular-sections can be formed and with a minimum amount of labor, thus overcoming the slow, tedious, wasteful, and expensive hand processes heretofore used.

What I claim as my invention, and desire to secure by Letters Patent, is—

1. In a machine for molding semitubular non-conducting coverings from materials which set by the addition of water thereto, the combination with an endless flexible mold having a long trough-like portion with the open side directed upwardly and arranged to travel horizontally, of means for moving the same, and a core coöperating with said mold.

2. In a machine for molding semitubular non-conducting coverings from materials which set by the addition of water thereto, the combination with an endless flexible mold having a long trough-like portion with the open side directed upwardly and arranged to travel horizontally, of means for moving the same, a core located in said mold, and means for moving said core.

3. In a machine for molding semitubular non-conducting coverings from materials which set by the addition of water thereto, the combination with an endless flexible mold having a long trough-like portion with the open side directed upwardly and arranged to travel horizontally, of means for moving the same, an endless core located in said mold, and means for moving said core along with the mold.

4. In a machine for molding semitubular non-heat-conducting coverings from materials which set by the addition of water thereto, the combination with an endless traveling belt, of means for moving the same, means for holding the same in trough form during a part of its course, and a core coöperating with said mold.

5. In a machine for molding semitubular non-heat-conducting coverings from materials which set by the addition of water thereto, the combination with an endless traveling belt, of means for moving the same, a trough for supporting the upper reach of said belt and holding the same in trough form, and a core coöperating with said mold.

6. In a machine for molding semitubular non-conducting coverings from materials which set by the addition of water thereto, the combination with an endless traveling sectional trough, of means for moving the same, a core located above said trough and arranged therein, and means for drawing a fabric through said trough and underneath said core.

7. In a machine for molding semitubular non-conducting coverings from materials which set by the addition of water thereto, the combination with an endless traveling belt, of means for moving the same, an endless traveling sectional trough for supporting the upper reach of said belt, and a core arranged in the upper trough-like portion of said belt.

8. In a machine for molding semitubular non-conducting coverings from materials which set by the addition of water thereto, the combination with an endless traveling sectional trough, means for moving the same, an endless traveling core arranged above and in said trough and traveling therewith, and means for drawing a fabric through said trough and underneath said core.

9. In a machine for molding semitubular non-heat-conducting coverings from materials which set by the addition of water thereto, the combination with an endless traveling belt-mold, of means for moving the same, means for holding the same in trough form during part of its course, and an endless traveling core located adjacent to the belt-mold and traveling therewith.

10. In a machine for molding semitubular non-conducting coverings from materials which set by the addition of water thereto, the combination with an endless flexible mold having a long trough-like portion with the open side directed upwardly and arranged to travel horizontally, of means for moving the same, a core coöperating therewith, and cover-plates for confining the material in the mold and forming and smoothing the edges of the article.

11. In a machine for molding semitubular non-conducting coverings from materials which set by the addition of water thereto, the combination with an endless mold having a long trough-like portion with the open side directed upwardly and arranged to travel horizontally, of means for moving the same, a stationary core-bar located in the horizontal portion of said mold, and cover-plates secured to said core-bar and projecting over the sides of said mold and serving to confine the material in the mold and to form and smooth the edges of the article.

12. In a machine for molding semitubular non-heat-conducting coverings from materials which set by the addition of water thereto, the combination with an endless traveling mold, of means for moving the same, a core coöperating therewith, said core comprising an endless traveling belt, and means for holding the lower reach thereof in a semicylindrical form.

13. In a machine for molding semitubular non-heat-conducting coverings from materials which set by the addition of water thereto, the combination with an endless traveling mold, of means for moving the same, a core coöperating therewith, said core comprising an endless traveling belt, and a core-bar for holding the lower reach of said belt in semicylindrical form.

14. In a machine for molding semitubular non-heat-conducting coverings from materials which set by the addition of water thereto, the combination with an endless-traveling-belt mold, of means for holding the same in trough shape during a part of its course, a core coöperating therewith, said core comprising an endless traveling belt, and means for moving the same along with the mold.

15. In a machine for molding semitubular non-heat-conducting coverings from materials which set by the addition of water thereto, the combination with an endless-traveling-belt mold, means for holding the same in trough form during part of its travel, a core located adjacent to the trough part of said belt, said core comprising an endless traveling belt, means for moving the same along with the mold, and a core-bar for holding the portion of the core-belt adjacent to the mold in semicircular form.

16. In a machine for molding semitubular non-heat-conducting coverings from materials which set by the addition of water thereto, the combination with an endless traveling trough-like mold, of a core coöperating therewith, a receptacle for the semiliquid material, and a spout leading from the receptacle and having a curved lower end lying in the mold.

17. In a machine for molding semitubular non-heat-conducting coverings from materials which set by the addition of water thereto, the combination with an endless traveling trough-like mold, of a core coöperating therewith, and means for applying a sheathing fabric to the outer surface of the articles.

18. In a machine for molding semitubular non-conducting coverings from materials which set by the addition of water thereto, the combination of an endless flexible traveling trough-like mold, of means for moving the same, an endless traveling core coöperating therewith, and means for dividing the article into sections.

19. In a machine for molding semitubular non-conducting coverings from materials which set by the addition of water thereto, the combination with an endless traveling trough-like mold, of means for moving the same, an endless traveling core coöperating therewith, and division-plates carried by said core and serving to divide the article into sections.

20. In a machine for molding semitubular non-conducting coverings from materials which set by the addition of water thereto, the combination with an endless traveling trough-like mold, of means for moving the same, a stationary core-bar arranged in said mold, an endless traveling belt passing underneath said core-bar, and division-plates carried by said belt and serving to divide the article into sections.

21. In a machine for molding semitubular non-heat-conducting coverings from materials which set by the addition of water thereto, the combination with an endless traveling trough-like mold, means for forming the article in sections, of racks provided with grooves for receiving the sections, and means for carrying away said racks.

22. In a machine for molding semitubular non-heat-conducting coverings from materials which set by the addition of water thereto, the combination with an endless traveling trough-like mold, of means for producing the article in sections, a series of shelves or racks provided with grooves for receiving said sections, and an elevator on which said racks are held.

23. In a machine for molding semitubular non-conducting coverings from materials which set by the addition of water thereto, the combination with an endless mold having a long trough-like portion with the open side directed upwardly and arranged to travel horizontally, of a core coöperating therewith, means for moving the same, means for dividing the article into sections, a series of racks or shelves for receiving said sections, a truck on which said racks are mounted, and an elevator for supporting said truck.

24. In a machine for molding semitubular non-conducting coverings from materials which set by the addition of water thereto, the combination with a plurality of parallel endless molds having long trough-like portions with the open sides directed upwardly and arranged to travel horizontally, of means for moving the same, a core coöperating therewith, means for dividing the articles into sections, and receiving means adjacent to the delivery end of said molds and of sufficient width to receive the articles from said plurality of molds.

25. In a machine for molding semitubular non-conducting coverings from materials which set by the addition of water thereto, the combination with two or more endless molds having long trough-like portions with the open sides directed upwardly and arranged to travel horizontally, of means for moving the same, cores coöperating therewith, means for supplying material to said molds, and means for delivering the molded articles therefrom.

26. In a machine for molding semitubular non-heat-conducting coverings from materials which set by the addition of water thereto, the combination of two endless traveling molds placed parallel and operating together, and means for introducing a strip of fabric to overlap said molds.

In testimony whereof I, the said JOHN A. McCONNELL, have hereunto set my hand.

JOHN A. McCONNELL.

Witnesses:
ROBERT C. TOTTEN,
F. W. WINTER.